United States Patent [19]

Requejo et al.

[11] Patent Number: 4,511,489

[45] Date of Patent: Apr. 16, 1985

[54] COMPOSITION FOR CLEANING AND IMPARTING ANTISTATIC PROPERTIES TO PLASTICS SURFACES

[75] Inventors: Luz P. Requejo; Charles J. Butke, both of Cincinnati, Ohio

[73] Assignee: The Drackett Company, Cincinnati, Ohio

[21] Appl. No.: 499,944

[22] Filed: Jun. 1, 1983

[51] Int. Cl.$^3$ .............................................. C09D 9/00
[52] U.S. Cl. .................... 252/172; 252/173; 252/174.15; 252/DIG. 2; 252/DIG. 10; 252/DIG. 14; 252/174.23
[58] Field of Search ...................... 252/89.1, 172, 173, 252/DIG. 10, DIG. 14, DIG. 2, 174.15, 174.23; 427/393.4; 106/2, 3, 6, 10

[56] References Cited

U.S. PATENT DOCUMENTS

| | | | |
|---|---|---|---|
| 2,702,276 | 2/1955 | Green | 252/8.6 |
| 2,757,094 | 7/1956 | Guss | 106/8 |
| 2,955,047 | 10/1960 | Terry | 106/3 |
| 3,352,787 | 11/1967 | Bodach | 252/108 |
| 3,392,040 | 7/1968 | Kass | 106/287 |
| 3,463,735 | 8/1969 | Stonebraker et al. | 252/162 X |
| 3,498,923 | 3/1970 | Zisman et al. | 252/171 |
| 3,948,819 | 4/1976 | Wilde | 252/545 |
| 4,075,362 | 2/1978 | Concannon | 427/22 |
| 4,118,235 | 10/1978 | Horiuchi et al. | 106/38.22 |
| 4,176,176 | 11/1979 | Cella et al. | 424/70 |
| 4,269,739 | 5/1981 | Grejsner | 252/547 |
| 4,302,348 | 11/1981 | Requejo | 252/135 |

FOREIGN PATENT DOCUMENTS 0017119 10/1980 European Pat. Off. .
30514 8/1972 Japan .

OTHER PUBLICATIONS

Tech. Bull., "Introducing Unique New MONFLOR ® Fluorochemical Surface Active Agents", ICI United States, Ltd.
Tech. Bull., "Flurad Brand Fluorochemical Surfactants-Surfactant FC-100", 3M Company, (Jul. 1981).

Primary Examiner—Paul Lieberman
Assistant Examiner—Hoa Van Le
Attorney, Agent, or Firm—Charles J. Zeller

[57] ABSTRACT

A cleaning and polishing composition for acrylic plastic substrates, including Plexiglas, Lexan and the like, as well as other hard surfaces is provided by an aqueous dispersion of a fluid silicone oil such as polydimethylsiloxane, a nonionic or anionic surfactant such as sodium lauryl sulfate and a fluorinated organic surface-active compound, the balance being water. These compositions provide fast, streak-free and dust repelling cleaning and polishing, especially suitable for Plexiglas and other acrylic plastic materials.

26 Claims, No Drawings

COMPOSITION FOR CLEANING AND IMPARTING ANTISTATIC PROPERTIES TO PLASTICS SURFACES

BACKGROUND OF THE INVENTION

1. Field of the Invention

This invention relates to a composition and method for cleaning and imparting antistatic properties to plastic surfaces. More particularly, this invention relates to an organic solvent-free aqueous composition or concentrate thereof for cleaning and polishing plastic substrates, particularly acrylic plastics, and other hard surfaces including vinyl, leather, formica, tile, polycarbonate and other plastic surfaces.

2. Discussion of the Prior Art

Formulations for cleaning plastic surfaces should desirably have the following properties:

(1) Nonreactive with the plastic substrate;
(2) No visible residual film or streaks;
(3) Easy wipe-off;
(4) Fast drying;
(5) Removal of oils, grease, fingerprints, fats, and other soils and dirts;
(6) Nontoxic;
(7) Impart antistatic film on surface of plastic substrate.

In order to assure nonreactivity of the cleaning composition with the plastic substrate, particularly for acrylic and polycarbonate based plastic surfaces, such as "Plexiglas", "Lucite", "Lexan" and the like, the cleaning composition should be free of organic solvents. The cleaning properties, per se, are generally provided by various anionic, nonionic, cationic and/or ampholytic surface-active agents and very broad classes of each of these types of surface-active agents have been disclosed in the art. It is also known, as disclosed for example, in U.S. Pat. No. 2,757,094 to Guss and in U.S. Pat. No. 2,955,047 to Terry to include a silicone fluid, particularly dimethylpolysiloxane, in plastic cleaning compositions to leave a thin lubricating coating on the plastic substrate to enhance the cleaning and polishing properties of the surface-active agents and to cause the treated surface to become smooth, slippery and electrostatically inert, thereby preventing the collection of dust, oil, grime and other soils on the surface.

U.S. Pat. No. 3,352,787 to Bodach teaches that the addition of an ionic surfactant, e.g., an anionic surfactant or a cationic surfactant, to a nonionic surfactant containing cleaning composition, inhibits crazing of plastic surfaces such as "Plexiglas".

Fluorinated and particularly perfluorinated surface-active materials have recently received wide attention in cleaning compositions. Zisman, et al in U.S. Pat. No. 3,498,923 discloses non-aqueous liquid surface-active compositions for displacing liquid organic films adsorbed to metal, glass, resin and polymeric surfaces, which compositions also have utility as dust repellants for said surfaces. The compositions are in the form of a solution of a small amount of a partially fluorinated long-chain alkyl monocarboxylic acid of the formula $F(CF_2)_m(CH_2)_nCOOH$ wherein m is an integer of from 2 to 5 and n is an integer of from 10 to 16, in a solvent which is an aliphatic naphtha having a minimum flash point of from about 108° F. to 140° F. or a liquid low molecular weight linear dimethyl silicone, the silicone ranging from the dimer to the octamer.

U.S. Pat. No. 3,948,819 to Wilde discloses cleaning compositions especially adapted for cleaning aluminum surfaces in which the surfactant system consists essentially of at least two nonionic polyethoxylated surfactants, the first of which contains from 35 to 55% oxyethylene units by weight, the second containing at least 55% oxyethylene units by weight but not less than 10% more oxyethylene units by weight than does the first surfactant, and an antiresoiling agent containing at least one fluoroaliphatic radical and at least one phosphate or substituted phosphate radical.

Grejsner in U.S. Pat. No. 4,269,739 discloses a composition for surface treatment and cleaning of objects, in particular records, which is an aqueous solution or emulsion of:

(A) from 0.001 to 1.2% by weight of natural or synthetic wax or wax-like substance,
(B) from 0.001 to 2.5% by weight of fluid silicone oil with lubricating activity,
(C) from 0.001 to 2.5% by weight of surface-active polysiloxane copolymer,
(D) from 0.001 to 1.2% by weight of fluorinated organic surface-active compound, and
(E) from 0.001 to 2.5% by weight of nonionic surfactant.

Requejo, one of the present inventors, has previously disclosed, in U.S. Pat. No. 4,302,348, a liquid composition for cleaning a wide variety of hard surfaces, such as metallic, plastic, tile, porcelain, glass and mirror surfaces, which composition is an improvement in the glass and mirrored surface cleaning composition described in U.S. Pat. No. 3,463,735 to Stonebraker, et al. In particular, the U.S. Pat. No. 4,302,348 patent to Requejo discloses that by adding as little as 0.011% by weight of a fluorinated hydrocarbon surfactant, and by adjusting the levels of the volatile materials in the Stonebraker compositions, a composition that functions equally well as both a glass or mirror cleaner and as a hard surface cleaner generally is achieved. Accordingly, the compositions disclosed by Requejo include at least each of a low boiling organic solvent and higher boiling organic solvent, a first surfactant that is an anionic or nonionic surfactant, a second surfactant that is an anionic or nonionic fluorinated hydrocarbon surfactant selected from the group consisting of (i) anionic fluorinated hydrocarbon surfactants wherein the fluorinated hydrocarbon portion has a branched chain structure and having aliphatic perfluorocarbon groups at one end thereof; (ii) nonionic fluorinated hydrocarbon surfactants having a fluorinated hydrocarbon portion exhibiting a branched structure and having the formula $R_f(OCH_2CH_2)_nOR_f$ or $R_f(OCH_2CH_2)_mOR$ wherein $R_f$ is $C_8F_{15}$, $C_{10}F_{19}$ or $C_{12}F_{23}$; R is a lower alkyl; n is an integer of from 10 to 30, and m is an integer of from 2 to 10, and (iii) anionic fluorinated hydrocarbon surfactants wherein the fluorinated hydrocarbon portion exhibits a straight chain structure and having aliphatic perfluorocarbon groups at one end of the chain thereof; (iv) an alkali metal polyphosphate and a fugitive alkaline material, the balance of the composition being water.

A mold release composition in the form of a solution or dispersion which includes a perfluoroalkyl group-containing phosphoric acid ester of the formula $(R_fYC_qH_{2q}O)_nPO(OH)_{3-n}$ wherein $R_f$ represents a perfluoroalkyl having 4 to 20 carbon atoms; Y is $CH_2CH(Z)$, Z being H, $CH_3$, $C_2H_5$, Cl or OR (wherein R is H, $CH_3$, $C_2H_5$, $COCH_3$, $COC_2H_5$ or $CH_2COOH$ or its salt, or $SO_2N(R')$, R' being an alkyl group having 1 to 4 carbon atoms), q is an integer of 0 to 4 and n is an integer of 1 to 3, or a salt thereof; at least one of either a noncurable polysiloxane having a boiling point of at least 100° C. and a melting point not higher than 150° C. or a highly fluorinated organic compound having a melting point below 150° C., and surface-active agents and a liquid carrier which may be water, is disclosed by Horiuchi, et al in U.S. Pat. No. 4,118,235.

There still remains a need for improved aqueous cleaning compositions, particularly for acrylic and polycarbonate plastics such as "Plexiglas", "Lucite", "Lexan" and the like which, in addition to satisfying each of the seven properties enumerated above, are effective polishing compositions, i.e. cause scratches in the plastic surface to seemingly disappear, without effecting the clarity of these plastic surfaces which are usually transparent or at least translucent.

It is, accordingly, an object to provide an improved formulation suitable for cleaning and polishing plastic surfaces.

It is a further object of the present invention to provide a composition for cleaning, polishing and imparting antistatic properties and lubricity to plastic substrates to effectively prevent redeposition of dust, oil and other grimy deposits on the cleaned surface.

A still further object of the present invention is to provide a cleaning composition having the above properties from readily available, nontoxic and inexpensive materials.

Still yet another further object of the present invention is to provide a cleaning and polishing composition suitable for industrial use on acrylic and polycarbonate plastic substrates, such as "Plexiglas", "Lucite", "Lexan", and the like.

It is also an object of the present invention to provide a method for cleaning plastic surfaces, particularly acrylic plastic surface, by providing a composition which is simple to use and easily removed.

SUMMARY OF THE INVENTION

These and other objects of the present invention which will become readily apparent from the following more detailed description have now been accomplished by an aqueous composition free or essentially free of organic solvents for cleaning and polishing plastic surfaces which consists essentially of (a) from about 0.5 to 10% by weight of a fluid silicone oil with lubricating activity, (b) from 0.1 to 5% by weight of an anionic or nonionic surfactant, (c) from about 0.005 to 1% by weight of a fluorinated organic surface-active compound and (d) water.

DETAILED DESCRIPTION OF THE INVENTION

The compositions of the present invention are useful for cleaning and polishing plastic surfaces. As used herein and in the appended claims, the term "plastic" is intended to include acrylic polymers, vinyl polymers, leather, formica and tile. However, the compositions of this invention are particularly effective when used to clean and polish acrylic plastic surfaces such as those known under the tradenames "Plexiglas", "Lucite", etc., and this latter group of plastic surfaces will be generically referred to herein and in the appended claims as "acrylic plastics".

The present invention is based, in part, on the discovery by the inventors that a particular class of fluorosurfactants when added to an aqueous composition of a fluid silicone oil and an anionic or nonionic surfactant results in various improvements including lowering surface tension; improving wetting, emulsification and dispersion of solution, and improving lubricity, especially in the dry state.

The compositions of the present invention provide an antistatic and dust repellant film which lasts for periods of at least three days and in many cases for two or more weeks, on plastic surfaces; removes dirt, grease, grime, dust, fingerprints and smoke films from plastic surfaces, and enables fast, streak-free cleaning of plastic surfaces, particularly acrylic plastic surfaces.

The essential active components of the compositions of this invention are the fluid silicone oil with lubricating activity (a), the anionic or nonionic surfactant (b), and the fluorinated organic surface-active compound (c). The silicone oil component (a) provides a protective wax-like coating to the surface being cleaned, while the anionic or nonionic surfactant (b) and the fluorinated organic surface-active compound (c) provide the cleaning function. The fluorosurfactant, in particular, functions to lower surface tension, improve wetting, emulsification and dispersion of solution, and improved lubricity, especially in the dry state.

These three essential components are added to water to form the cleaning composition. The compositions of this invention are essentially free from organic solvents since the plastic substrates for which the compositions of this invention are especially useful are generally soluble in organic solvents. However, it is often the case that the fluorinated organic surface-active compounds useful in the compositions of this invention are commercially available in the form of their solution in an organic solvent or mixed aqueous organic solvent. Such small amounts of organic solvent as may be added to the composition with the fluorosurfactant can be tolerated, for example, amounts of organic solvent up to about 0.5% by weight, especially up to about 0.1% by weight, and especially preferably up to about 0.05% by weight. Nevertheless, the direct addition of organic solvents to the cleaning compositions of this invention, most particularly where intended for use in cleaning and polishing plastic surfaces, especially acrylic plastic surfaces, should be avoided.

Component (a) is a fluid silicone oil having lubricating activity. These silicone oils, also known as organo-silicone polymers and polysiloxanes, are a well-known class of compounds and have the general formula:

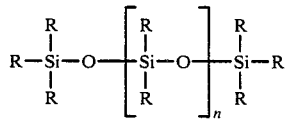

wherein all of the Rs are nonhydrolyzable monovalent hydrocarbon radicals, such as alkyl of from 1 to about 8 carbon atoms, benzyl or phenyl and n is an integer which will vary depending on the viscosity of the silicone oil and generally is a number of from 1 to about 500. The silicone fluids or oils are commercially available in viscosities ranging from about 40 to about 100,000 centistokes. The preferred viscosity for the fluid silicone oils is from about 40 to 15,000 centistokes, preferably from 40 to 1,000 centistokes and most preferably from about 200 to 500 centistokes. These viscosity values are given at a temperature of 25° C.

The most preferred class of fluid silicone oils for use in the compositions of this invention are the polydimethylsiloxanes having a viscosity of about 200 to 500 centistokes at 25° C. The polydimethylsiloxanes are readily commercially available from a wide variety of sources, for example, Dow-Corning 200 Fluid, General Electric SF-96, Union Carbide L.E. 453 HS, and the like.

The fluid silicone oil is present in the compositions in amounts of from about 0.5 to 10% by weight, preferably from about 1 to 5% by weight, especially preferably about 2% by weight, based on the total composition, on an active basis.

The next essential ingredient of the cleaning and polishing composition of this invention is the component (b) anionic or nonionic surfactant. Any of the anionic and nonionic surfactants which are compatible with the fluid silicone oil and the fluorinated organic surface-active compound can be used in the compositions of this invention. Examples of anionic surfactants include the alkali metal and ammonium salts of alkyl sulfates, alkali metal and ammonium salts of alkyl ether sulfates, alkali metal alkylaryl sulfonates, thioether sulfates, and thioether sulfonates. The alkyl groups may have from about 6 to about 23 carbon atoms, preferably from about 10 to 20 carbon atoms. Specific examples of anionic surfactants include sodium lauryl sulfate, sodium lauryl ether sulfate and sodium dodecylbenzene sulfonate. Sodium lauryl sulfate is especially preferred as the anionic surfactant.

Examples of nonionic surfactants include the linear primary alcohol ethoxylates, especially those having from about 8 to about 12 carbon atoms reacted with an average of 2.5 moles ethylene oxide, and polyethylene oxide ethers of fatty alcohols, in which the number of ethylene oxide groups in the molecule may vary from about 1 to 30, preferably from about 5 to 15, and the fatty alcohols have from about 8 to 20 carbon atoms. Sodium lauryl sulfate is especially preferred as component (b).

The amount of the component (b) surfactant is, on an active basis, from about 0.1 to 5% by weight, preferably from about 0.1 to 2% by weight, and especially preferably about 0.25% to 1% by weight.

The third essential ingredient of the composition is the component (c) fluorinated organic surface-active compound. The fluorosurfactant may be an anionic or nonionic fluorinated hydrocarbon surfactant. Suitable fluorosurfactants are commercially available under the trademarks "Fluorad" by the 3M Company, "Monflor" by I.C.I. Ltd., and "Zonyl" by E. I. duPont de Nemours and Co.

The Monflor series of fluorinated surfactants are polymerizates of tetrafluoroethylene, e.g. Monoflor 31, a 30% active solution of the sodium salt of a branched chain perfluoroalkenyl oxybenzene sulfonic acid of the formula $C_{10}F_{19}OC_6H_4SO_3(-) \ Na(+)$, in a solvent comprising 33.3% isopropanol and 67.7% water. The Fluorad series include types FC-100, FC-128 and FC-129. Flourad FC-100 is a sodium fluoroalkyl sulfonate available as a 25% active solution, in a solvent comprising 33.3% diethylene glycol monobutyl ether and 66.7% water; Fluorad FC-128 is a potassium fluoroalkyl carboxylate available as a 100% active powder, and Fluorad FC-129 is a potassium fluoroalkyl carboxylate available as a 50% active solution, in a solvent comprising 35.2% butoxyethanol, 7.8% ethanol and 57% water.

The Zonyl series of fluorosurfactants include types FSA, FSJ and FSP. Zonyl FSJ is particularly preferred and is a mixture of the following four components:

Poly(oxy-1,2-ethanediyl),α,α'-[(methyloctadecenyliminio)di-2,1-ethanediyl]bis[w-hydroxy-],methyl sulfate (salt) of formula: $(C_2H_4O)_m(C_2H_4O)_mC_{23}H_{48}NO_2.CH_3O_4S$;

Poly(difluoromethylene),α,α'-[phosphinicobis(oxy-2,1-ethanediyl)]bis[w-fluoro-], ammonium salt of formula: $(CF_2)_m(CF_2)_mC_4H_9F_2O_4P.H_3N$;

Poly(difluoromethylene),α-fluoro-w-[2-(phosphonooxy)ethyl]-, monoammonium salt of formula: $(CF_2)_mC_2H_6FO_4P.H_3N$; and Poly(difluoromethylene),α-fluoro-w-[2-(phosphonooxy)ethyl]-, diammonium salt of formula: $(CF_2)_mC_2H_6FO_4P.2H_3N$.

While especially good results have been accomplished with Zonyl FSJ, Fluorad FC-128 and FC-129 and Monflor 31 as the fluorinated surfactants, any of the fluorinated surfactants as disclosed in the Requejo U.S. Pat. No. 4,320,348 can also be used. These include anionic fluorinated surfactants having a fluorinated hydrocarbon portion which exhibits a branched chain structure and having aliphatic perfluorocarbon groups at one end of the molecule. Other examples of suitable fluorinated anionic surfactants are those where the fluorinated carbon portion exhibits a straight chain structure, having aliphatic perfluorocarbon groups at the end of the chain. Examples of suitable nonionic fluorinated surfactants are those where the fluorinated hydrocarbon portion exhibits a branched chain structure and which have aliphatic perfluorocarbon groups at both ends of the chain such as those having the formula: $R_f(OCH_2CH_2)_pOR_f$, wherein $R_f$ is $C_8F_{15}$, $C_{10}F_{19}$ or $C_{12}F_{23}$ and p is from 10 to 30. Other suitable nonionic fluorinated hydrocarbon surfactants are those wherein fluorinated hydrocarbon portions exhibits a branched chain structure and which an aliphatic perfluorocarbon group at one end of the chain, such as those having the formula: $R_f(OCH_2CH_2)_qOR$ wherein R is a lower alkyl, suitably $CH_3$, q is from 2 to 20 and $R_f$ is $C_8F_{15}$, $C_{10}F_{19}$ or $C_{12}F_{23}$.

These fluorinated hydrocarbon surfactants can be present in amounts, on an active basis, of from about 0.005 to 1% by weight, preferably from about 0.005 to about 0.1% by weight and especially preferably from about 0.0075 to about 0.075% by weight.

Other conventional adjuvants or additives which do not interfere with the cleaning and polishing function of the formulation and which do not leave any significant residue on the material being cleaned can be included in the compositions of this invention. Examples of permissible additives include, for instance, perfumes, dyes and preservatives. A particularly preferred preservative for industrial use of the invention compositions is formaldehyde, for example 0.04 wt%.

The last of the essential ingredients is water which will make up the balance of the composition. In order to achieve a composition with a low concentration of nonvolatile ingredients, it has been found that the aqueous components should preferably be made up of deionized or soft water. The amount of water will generally be in excess of about 90% by weight of the total composition, preferably at least about 95% by weight of the total composition.

The compositions can be made by mixing the various ingredients in any particular order and in any suitable amounts within the ranges specified above. In use, these compositions are applied to a surface, particularly hard surfaces such as plastic, formica, tile, glass, polycarbonate, and the like, in any conventional manner, such as spraying, pouring, etc. After being left in contact with the surface, the composition is removed by wiping the surface with a clean dry absorbent material. After removal of the composition, the surface is clean and requires no rinse. A thin film of the silicone fluid is left on the surface to prevent resoiling and to prevent accumulation of dust.

The compositions of the present invention can be used for fast, streak-free cleaning of Plexiglas, Lexan, Lucite and other acrylic surfaces and can remove dirt, grease, grime, dust, fingerprints, and smoke film. These compositions can also be used on various other plastic surface, including for example, safety glass, vinyl, leather, formica, tile, polycarbonate, glass and the like.

The following examples illustrate the present invention.

EXAMPLE 1

Each of the formulations shown in the following table was prepared:

TABLE 1

| Ingredient | 1-A | 1-B | 1-C | 1-D | 1-E | 1-F | 1-G | 1-H |
|---|---|---|---|---|---|---|---|---|
| Polydimethylsiloxane[a] | 2.0 | 2.0 | 2.0 | 2.0 | 2.0 | 2.0 | 5.0 | 2.5 |
| Sodium lauryl sulfate[b] | 1.0 | 1.0 | 1.0 | 1.0 | 1.0 | 1.0 | 0.3[c] | 2.5 |
| Fluorosurfactant | | | | | | | | |
| Zonyl FSJ (40% active) | 0.08 | | | | | | | |
| Zonyl FSA (50% active) | | 0.06 | | | | | | |
| Zonyl FSP (35% active) | | | 0.1 | | | | | |
| Fluorad FC 120 (25% active) | | | | 0.12 | | | | |
| Fluorad FC 129 (50% active) | | | | | 0.06 | | | |
| Monflor 31 (30% active) | | | | | | 0.1 | | |
| Monflor 52 (100% active) | | | | | | | 0.1 | |
| Distilled Water | 96.92 | 96.94 | 96.9 | 96.88 | 96.94 | 96.9 | 94.6 | 95.0 |
| pH | 7.40 | 7.40 | 7.50 | 7.50 | 7.60 | | | |
| Refractive Index (R.I.) | 1.3339 | 1.3341 | 1.3340 | 1.3340 | 1.3341 | | | |

[a]LE 453 HS - Union Carbide (53–57% active)
[b]Equex-S - Procter & Gamble (29% active)
[c]Sipon WD - Lakeway Surfactant (100% active)

EXAMPLE 2

In order to test the ability of the formulations of Example 1 to provide fast, streak-free antidust accumulating cleaning of acrylic plastics, the following tests were carried out.

Three Plexiglas plates, each of which was initially uniformly scratched over its entire surface, were divided into two equal sections. The right side of the first plate was cleaned with Twinkle ® silver polish followed by the composition of Formula 1-F. The left side of the first plate was first cleaned with a commercially available medium duty plastic polish formula (Novus ® No. 2) followed by a second cleaning with a commercially available plastic cleaning formulation (Novus ® No. 1). According to the label of Novus No. 2, this formulation is designed to remove fine scratches from plastic surfaces. The label of Novus No. 1 indicates that this formulation is intended to provide an antistatic, dust repellant protective coating for use in all plastic surfaces.

As a result of the two-step cleaning on the first plate, both the right half and left half sections looked equally the same and had the same dry lubricity.

Each of the right half portion of the second plate and left half portion of the third plate were cleaned with the formulation of formula 1-F while the left half portion of the second plate and right half portion of the third plate were sequentially cleaned with Novus No. 1 and Novus No. 2 formulations. On casual observation of the cleaned plates, the scratches on both halves of both plates seemed to disappear. However, on close inspection, it was observed that the Novus cleansers had added more very fine scratches to the Plexiglas plates.

EXAMPLE 3

This example demonstrate the resistances to dust deposits (dust repellancy) of the composition of formula 1-F as compared against several commercially available hard surface cleansers that claim to provide a dust repellant film.

In this test, six identical Plexiglas plates were cleaned with an equivalent amount of each of the products shown in the following table and after wiping dry, the cleaned Plexiglas plates were exposed to the atmosphere for a period of three days with the results shown in the following table:

TABLE 2

| Product | Results |
|---|---|
| Formula 1-F | Very few dust particles observed |
| Dustless | Did not seem to resist dust deposition. dust visible on the surface |
| Brillianize | Dust particles visible on the surface |
| Novus | Very few dust particles can be seen |
| Good Measuring Cooking Spray | Many streaks with dust sticking to residual product |
| Control | Dust all over the surface |

EXAMPLE 4

In order to evaluate the ease of application and dry lubricity of other fluorosurfactants of Example 1 relative to the formulation 1-F containing Monflor 31, the following test was performed.

Identical Plexiglas panels were sprayed with the same amount of cleanser and the lubricity was observed relative to the results obtained using formula 1-F.

The best lubricity was achieved with formula 1-A using Zonyl FSJ as the fluorosurfactant. Formulas 1-B, 1-C and 1-D and 1-F containing Zonyl FSA, Zonyl FSP, Fluorad FC 120, and Monflor 31, respectively, had slightly inferior lubricity but any differences between these formulations was difficult to detect. Formulation 1-E containing Fluorad FC-129 was somewhat inferior in lubricity to the other formulations.

EXAMPLE 5

In a dust repellancy test in which identical new Plexiglas panels were first cleaned with deionized water and then with equal amounts of formulations 1-A, 1-D or 1-F and hung from the ceiling for seven days, each of the test panels had only very slight dust accumulation and the dust repellancy of each of these formulations was judged to be about equal.

EXAMPLE 6

The general cleaning ability of the composition of the present invention against various types of dirt and stains was measured. Each of six separate Plexiglas panels were stained with each of the following:
(1) fingerprints
(2) Planters 100% peanut oil (3-5 grams)
(3) Mazola Corn Oil (3-5 grams)
(4) Karo "Light" Corn Syrup (3-5 grams)
(5) Mayonnaise (3-5 grams)

A quantity of the composition of formula 1-A was placed in an aerosol pump container. Ninety minutes after each of the test soils was applied to each of the six test panels, the cleaning composition was applied in an amount equivalent to three pumps of the aerosol dispenser. Each panel was then stroked twelve times with a ninety grade cheesecloth.

Each of the cleansers was capable of substantially completely removing the greasy and oily stains. A few streaks still remained on the Plexiglas panels, but these were easily removed with a small second application.

EXAMPLE 7

This example shows the ability of the cleaning compositions of this invention to clean smokey deposits from Plexiglas panels.

Twelve Plexiglas panels were stained with a hickory smoker made by Outers, Model No. 1008. Six panels were "smoked" for four hours using Outers "Ye Old Hickory 100% Pure Pulverized Hickory" wood chips following the directions on the box. The second group of six panels were smoked in the same manner and procedure as above only this time using a mixture of hickory wood chips and "Half-and-Half Burley and Bright Smoking Tobacco".

After sitting over night, each of the twelve panels was cleaned with three pumps of an aerosol spray dispenser filled with formula 1-A following the same procedure as in Example 6, namely twelve strokes of 90 grade cheesecloth.

The smoke stains were removed from each of the panels although again a few streaks remained. However, these were easily removed with a little additional cleanser and a quick wipe with a clean cloth.

In addition to the ability to provide fast, streak-free, dust repelling and scratch removing polishing and cleaning on Plexiglas, the formulations of this invention are found to be equally effective on Lexan and other acrylic surfaces as well as on safety glass, vinyl, leather, formica and tile.

What is claimed is:

1. A wax-free composition for cleaning polyacrylic and polycarbonate plastic surfaces which, on an active basis by weight of said composition, consists essentially of:
    (a) from 0.5 to about 10% of a fluid silicone oil having lubricating activity, said silicone oil being a polydimethylsiloxane having a viscosity of from 40 to 100,000 centistokes at 25° C.;
    (b) from about 0.1 to 5% of an anionic or nonionic surfactant;
    (c) from about 0.005 to 1% of an anionic or nonionic fluorinated organic surface active compound selected from the group consisting of:
        (i) anionic fluorinated hydrocarbon surfactants wherein the fluorinated hydrocarbon has a branched chain structure and having aliphatic perfluorocarbon groups at one end thereof;
        (ii) nonionic fluorinated hydrocarbon surfactants having a fluorinated hydrocarbon portion exhibiting a branched structure and having the formula:

$R_f(OCH_2CH_2)_nOR_f$ wherein $R_f$ is $C_8F_{15}$, $C_{10}F_{19}$ or $C_{12}F_{23}$ and n is an integer from 10 to 30;
        (iii) nonionic fluorinated hydrocarbon surfactants wherein the fluorinated hydrocarbon portion exhibits a branched structure and having the formula:

$R_f(OCH_2CH_2)_mOR$ wherein $R_f$ is as in (ii), R is a lower alkyl and m is an integer from 2 to 10; and
        (iv) anionic fluorinated hydrocarbon surfactants wherein the fluorinated hydrocarbon portion exhibits a straight chain structure and having aliphatic perfluorocarbon groups at one end of the chain thereof, and
    (d) water,
said composition containing less than 0.5% by weight of an organic solvent.

2. The composition of claim 1 wherein the anionic or nonionic surfactant is selected from the group consisting of alkali metal alkyl sulfates, ammonium alkyl sulfates, alkali metal alkylether sulfates, ammonium alkylether sulfates, alkali metal alkylaryl sulfonates, thioether sulfates, thioether sulfonates, linear primary alcohol ethoxylates and polyoxyethylene oxide ethers of fatty alcohols.

3. The composition of claim 2 wherein the anionic or nonionic surfactant is the anionic surfactant sodium lauryl sulfate.

4. The composition of claim 1 wherein the polydimethylsiloxane is present in an amount of from about 1 to about 5% by weight of the composition.

5. The composition of claim 4 wherein said anionic or nonionic surfactant is present in an amount of from about 0.1 to about 2%.

6. The composition of claim 4 wherein said fluorinated organic surface active agent is present in an amount of from about 0.005 to about 0.1%.

7. The composition of claim 6 wherein said anionic or nonionic surfactant is selected from the group consisting of alkali metal alkyl sulfates, ammonium alkyl salts, alkali metal alkylether sulfates, ammonium alkylether sulfates, alkali metal alkylaryl sulfonates, thioether sulfates, thioether sulfonates, linear primary alcohol ethoxylates and polyoxyethylene oxide ethers of fatty alcohols.

8. The composition of claim 7 wherein the polydimethylsiloxane has a viscosity of from about 40 to 15,000 centistokes at 25° C.

9. The composition of claim 8 wherein the fluorinated organic surface active agent is selected from the group consisting of: (1) the sodium salt of a branched chain perfluoroalkenyloxybenzene sulphonic acid of the formula: $C_{10}F_{19}OC_6H_4(SO_3)^{(-)}Na^{(+)}$; (2) the potassium salt of a fluoroalkyl carboxylate, and (3) a mixture of fluorinated compounds of the formula (i) $(CF_2)_m(CF_2)_mC_4H_9F_2O_4P \cdot H_3N$, (ii) $(CF_2)_mC_2H_6FO_4P \cdot H_3N$, (iii) $(CF_2)_mC_2H_6FO_4P \cdot 2H_3N$, and (iv) $(CH_2H_4O)_m(CH_2H_4O)_mC_{23}H_{48}NO_2 \cdot CH_3O_4S$, wherein m is an integer from 2 to 10.

10. The composition of claim 9 wherein the anionic or nonionic surfactant is the anionic surfactant sodium lauryl sulfate.

11. The composition of claim 9 wherein the fluorinated organic surface active agent is present in an amount of from about 0.0075 to about 0.075% by weight of the composition.

12. The composition of claim 9 wherein the polydimethylsiloxane is present in an amount of from about 1 to about 2.5% by weight.

13. The composition of claim 12 which includes an effective amount of formaldehyde as a preservative.

14. The composition of claim 13 wherein formaldehyde is present in an amount of less than about 0.04% by weight of the composition.

15. The composition of claim 13 wherein the anionic or nonionic surfactant is the anionic surfactant sodium lauryl sulfate present in an amount of from about 0.25 to about 1.0% by weight.

16. The composition of claim 7 containing less than about 0.1% by weight of an organic solvent.

17. The composition of claim 12 wherein the fluorinated surfactant is $C_{10}F_{19}OC_6H_4(SO_3)Na$.

18. The composition of claim 12 wherein the fluorinated surfactant is the potassium salt of a fluoroalkyl carboxylate.

19. The composition of claim 12 wherein the fluorinated surfactant is a mixture of fluorinated compounds of the formula (i) $(CF_2)_m(CF_2)_mC_4H_9F_2O_4P \cdot H_3N$, (ii) $(CF_2)_mC_2H_6FO_4P \cdot H_3N$, (iii) $(CF_2)_mC_2H_6FO_4P \cdot 2H_3N$, and (iv) $(CH_2H_4O)_m(CH_2H_4)_mC_{23}H_{48}NO_2 \cdot CH_3O_4S$, wherein m is an integer from 2 to 10.

20. The composition of claim 12 which includes formaldehyde as a preservative.

21. The composition of claim 12 wherein the polydimethylsiloxane lubricating fluid has a viscosity at 25° C. of from about 200 to about 500 centistokes.

22. A method for cleaning an acrylic or polycarbonate plastic surface, and for imparting to said surface a coating to reduce dust accumulation, the method comprising the steps of applying to said surface the composition of claim 1 and wiping said surface with a cloth, sponge, or towlette.

23. The method of claim 22 wherein the composition of claim 7 is applied to said plastic surface.

24. The method of claim 22 wherein the composition of claim 12 is applied to said plastic surface.

25. The method of claim 22 wherein the composition of claim 15 is applied to said plastic surface.

26. The method of claim 22 wherein the composition of claim 18 is applied to said plastic surface.

* * * * *